(12) United States Patent
Huang

(10) Patent No.: US 6,609,614 B1
(45) Date of Patent: Aug. 26, 2003

(54) DISC LOCATION MECHANISM OF CD BOXES

(76) Inventor: Pei-Lin Huang, 1F, No. 3, Lane 9, Liancheng Rd., Junghe City, Taipei Hsien (TW)

( * ) Notice: Subject to any disclaimer, the term of this patent is extended or adjusted under 35 U.S.C. 154(b) by 0 days.

(21) Appl. No.: 10/112,741

(22) Filed: Apr. 2, 2002

(51) Int. Cl.[7] ............................................. B65D 85/57
(52) U.S. Cl. .................................. 206/308.1; 206/310
(58) Field of Search ........................... 206/308.1, 309, 206/310–312, 493, 472

(56) References Cited

U.S. PATENT DOCUMENTS

| | | | | |
|---|---|---|---|---|
| 4,903,829 A | * | 2/1990 | Clemens | .................. 206/308.1 |
| 5,388,713 A | * | 2/1995 | Taniyama | ................. 206/308.1 |
| 6,296,115 B1 | * | 10/2001 | Kurosawa et al. | ........ 206/308.1 |
| 6,398,022 B1 | * | 6/2002 | Mou et al. | ................. 206/308.1 |
| 6,478,150 B1 | * | 11/2002 | Solling | ..................... 206/308.1 |

* cited by examiner

Primary Examiner—Luan K. Bui
(74) Attorney, Agent, or Firm—Rosenberg, Klein & Lee

(57) ABSTRACT

The present invention relates to an improved disc location mechanism of the CD box, characterized by one disc compartment, several pairs of take-and-put holding mechanism, one first holding piece and one second holding piece. When the user covers up the CD box, the holding props of the first holding piece and the second holding piece shore up the disc inside the CD box. When the user opens up the CD box and attempts to take off the disc, the elasticity of the elastic piece enables the user to take off the stuck disc easily.

4 Claims, 5 Drawing Sheets

DISC LOCATION MECHANISM OF CD BOXES

BACKGROUND OF THE INVENTION

1. Field of the Invention

The present invention relates to a disc location mechanism of the CD box, especially the disc location mechanism of the CD box activated by propping up and the elasticity of the elastic piece.

2. Description of the Prior Art

With the popularity of multi-media information and the peripheral storage devices of the computers, how to carry the enormous information around has become a common issue. Because of the large storage of CDs, storing multi-media and computer information in CDs to carry about has become a common practice nowadays. To respond to the prevalence of this fashion, CDs boxes become a handy and practical tool.

Because of the ill design of the internal location mechanism, traditional CD boxes usually fail to secure the CD on the exact location effectively when carrying or moving the CD around, causing the CD to shake or revolve, which in tune causes the scratches on the surface of the CD and displacement. Undoubtedly, such damage causes great inconvenience for those who exhibit CD shows frequently or who treasure up CDs. What's more, by the time of using the information in the CDs for emergency, the damage to the information resulted from the scratch on the surface of the CD might lead to unredeemable loss.

This indicates traditional CD boxes still have many disadvantages and still have much for improvement.

In view of such disadvantages generated by traditional CD boxes, the inventor of the present invention was devoted to finding a solution. After years research, the inventor accomplished the disc location mechanism of the CD box.

SUMMARY OF THE INVENTION

The main objective for the present invention is to provide a disc location mechanism of the CD box in which the disc inside is propped up by the holding props of the first holding piece and the holding props of the second holding piece when the user covers up the CD box, preventing the disc in the box from shaking during carrying around, which in turn protects the surface of the CD from being scratched due to displacement and revolving.

Another objective of this present invention is to provide a disc location mechanism of the CD box in which, through the holding mechanism placed at the center of the disc compartment, the disc can be departed from being stuck up through the elasticity of the elastic piece when the user opens up the CD box and takes off the CD.

The third objective of this present intention is to provide a disc location mechanism of the CD box in which the disc can be easily taken off from every direction by the more than one sockets settled at the edges of the disc compartment.

The disc location mechanism designed for the invention objectives above is basically located inside the CD box, characterized in that:

One disc compartment with four sockets on the edges of the disc compartment, each one lies at an equal distance from one another;

three pairs of take-and-put holding mechanism for taking and placement, in which each pair of mechanism contains a elastic piece and a fixture piece and the fixture piece of each group connects to one another;

one first holding piece with at least one or more props;

one second holding piece with at least one or more props; and each mechanism mentioned above combing with the CD box makes the completed invention. Each mechanism mentioned above lies inside the CD box consisting of a box body and box lid connected together. The disc compartment is settled adequately on the box body with more than one holding mechanism on the center of the disc compartment for taking and putting; the first holding piece is situated on the edge of the box body and the second holding piece sits adequately on the edge that joints the box body and the box lid. When the user places the CD on the disc compartment, covering up the box body and the box lid, the disc is propped up by the holding props of the first and the second holding piece; meanwhile, the protruding lump of the elastic piece fastens the CD to its location. When the user opens up the CD box and tries to take off the disc, the elasticity of the elastic piece make the disc stuck by the protruding lump of the elastic piece taken off easily.

BRIEF DESCRIPTION OF THE DRAWINGS

The drawings disclose an illustrative embodiment of the present invention which serves to exemplify the various advantages and objects hereof, and are as follows:

FIG. 1(A) is a partially-magnified three-dimensional illustration for the disc location mechanism of the CD box.

DETAILED DESCRIPTION OF THE INVENTION

Figure 1:
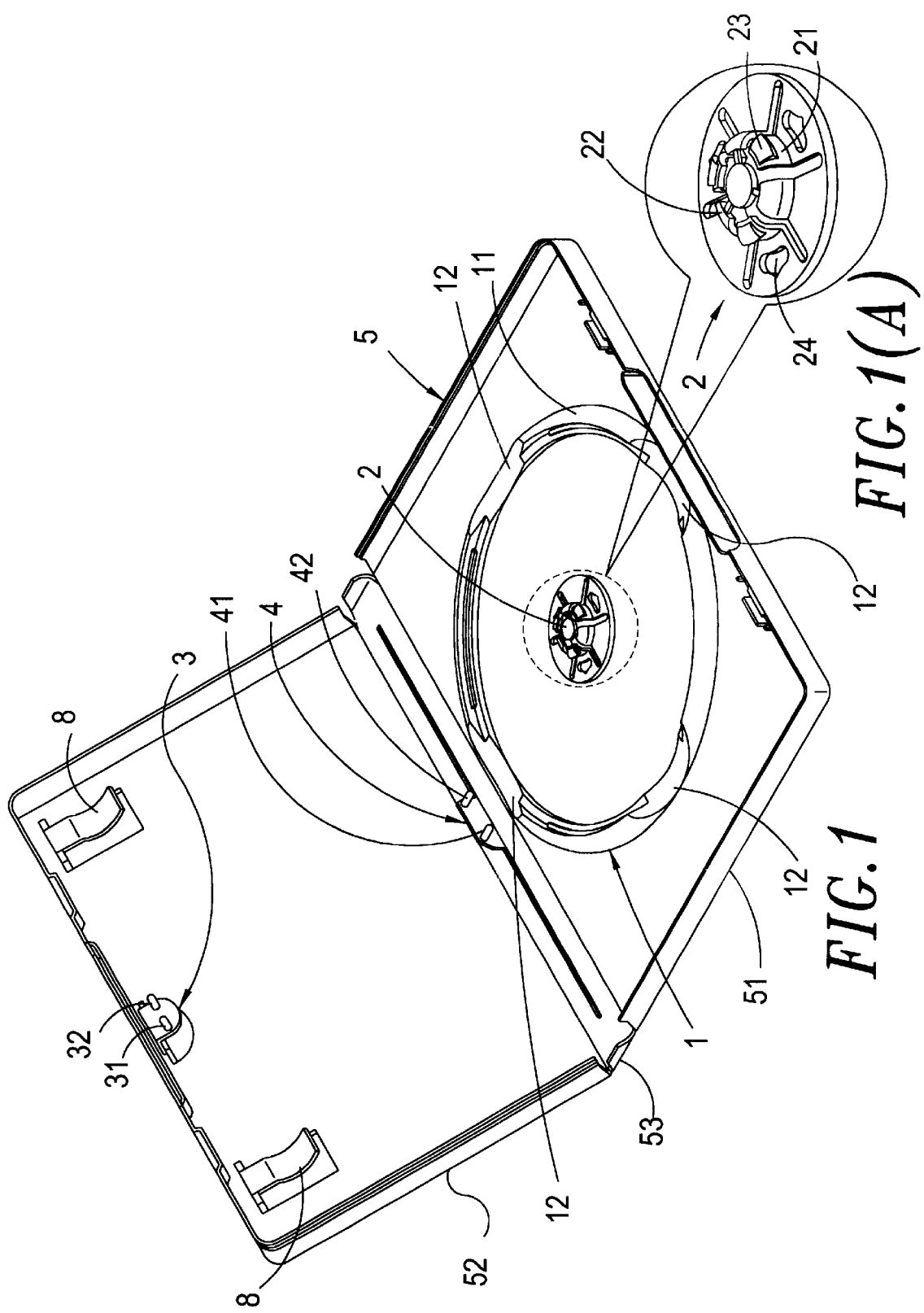
FIG. 1 is a three-dimensional illustration for the disc location mechanism of the CD box.

Please refer to FIG. 1 and FIG. 1(A). FIG. 1 is a three-dimensional illustration for the disc location mechanism of this present invention CD box, while FIG. 1(A) is the partially-magnified three-dimensional illustration for the disc location mechanism of this present invention CD box. The disc location mechanism of this CD box consists of one disc compartment 1, three pairs of take-and-put holding mechanism 2 and one first holding piece 3 and one second holding piece 4. The disc compartment 1 is located inside the CD box 5 with four sockets 12 at equal distance on the edge 11 of the disc compartment 1. Each pair of take-and-put holding mechanism 2 has a elastic piece 21 and one fixture piece 22. A hole is set 24 on the bottom edge of the elastic piece 21 to increase the elasticity of the elastic piece 21. At the top of the elastic piece sits a protruding lump 23. The fixture piece 22 of each pair connects with one another. The first holding piece 3 is equipped with two holding props 31 32, while the second holding piece 4 is furnished with another two props 41,42. All mechanism mentioned above lie in the CD box 5 combined with the box body 51 and the box lid 52. The disc compartment 1 is situated adequately inside the box body 51 with three pairs of take-and-put holding mechanism 2 at the center of the disc compartment 1. The first holding piece 3 is on the edge of the box lid 52 while the second holding 4 piece sits on the joint 53 that connects box body 51 and box lid 52.

Figure 2:
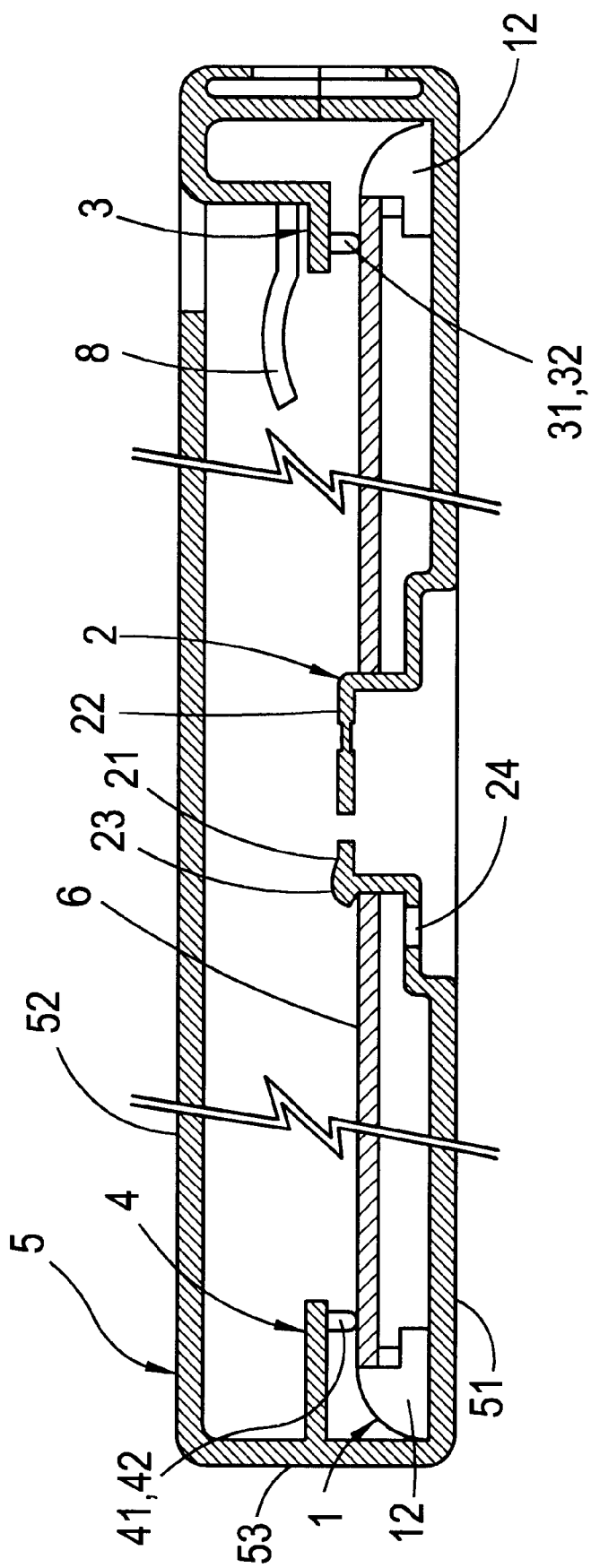
FIG. 2 is the first sectional illustration for the disc location mechanism of the CD box.

Please refer to FIG. 2—the first sectional illustration for the disc location mechanism of the CD box. When the user places the disc 6 inside the disc compartment 1, covering up the box body 52 and the box lid 51, the disc 6 is shored up by the holding props 31, 32 of the first holding piece 3 and the props 41,42 of the second holding piece 4. Meanwhile, the protruding lump 23 of the elastic piece 21 fastens the disc 6 on the disc compartment 1.

Figure 3:
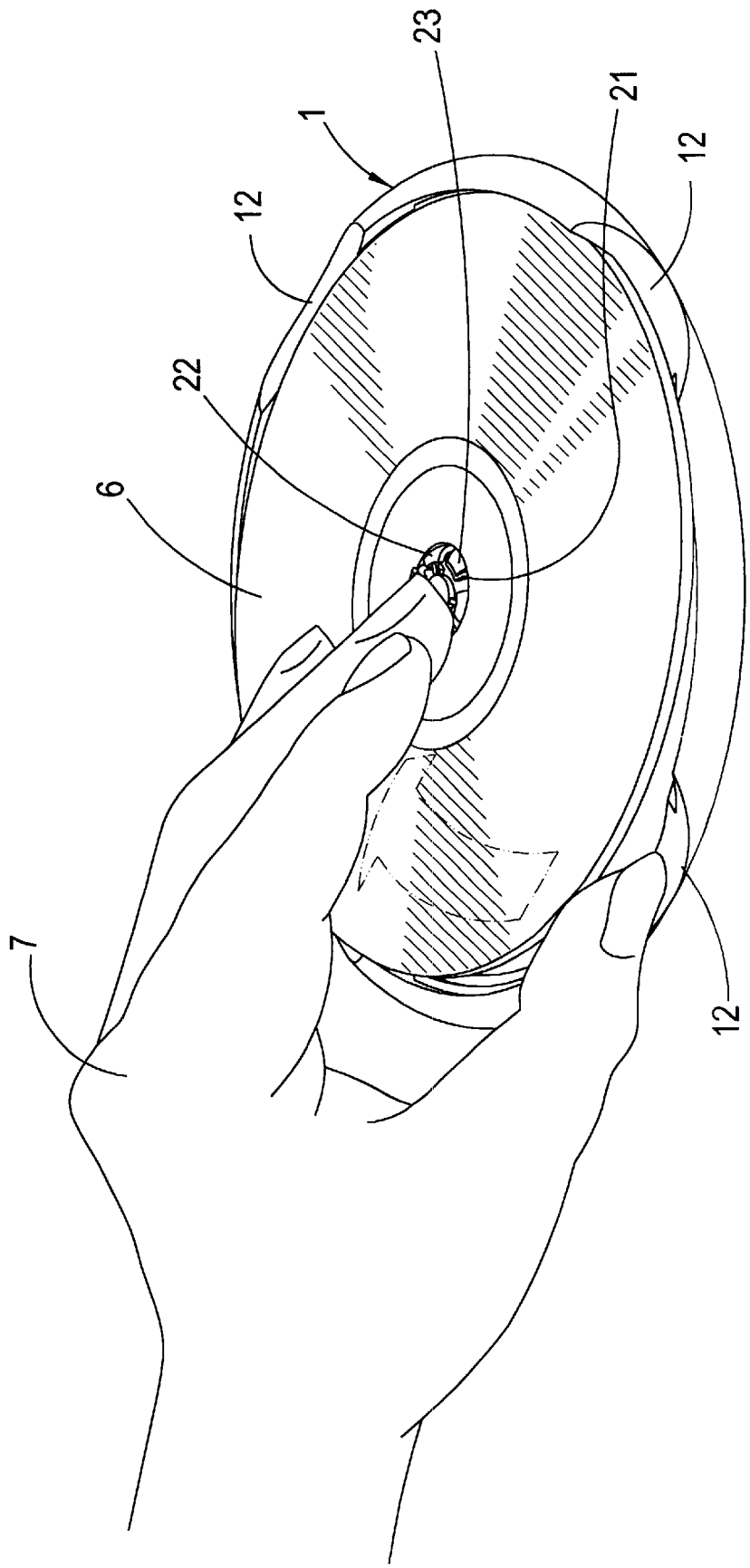
FIG. 3 is the second sectional illustration for the disc location mechanism of the CD box.
Figure 4:
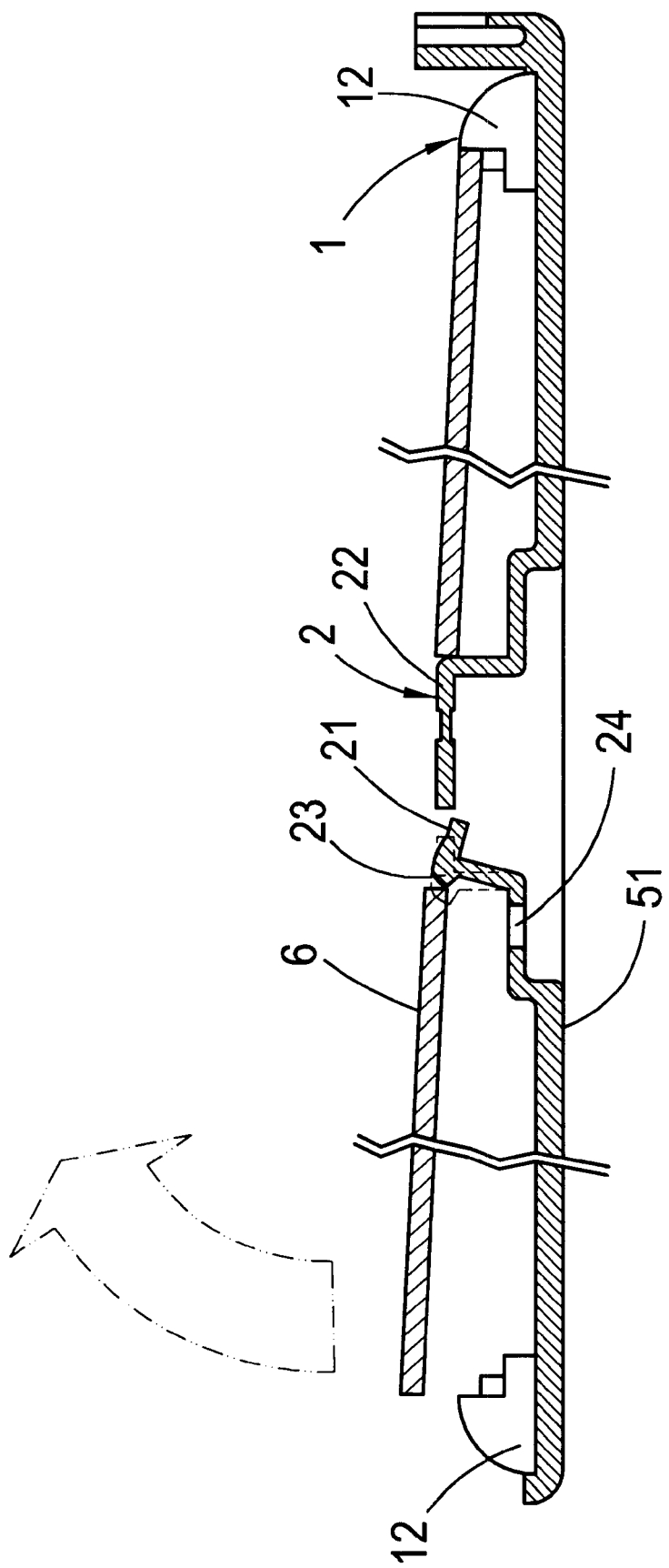
FIG. 4 is the second sectional illustration for the disc location mechanism of the CD box.

Please refer to FIG. 3 and FIG. 4. FIG. 3 is the second three-dimensional illustration for the disc location mechanism of the CD box, and FIG. 4 is the second sectional illustration for the disc location mechanism of the CD box. When the user opens up the CD box 5 and attempts to take off the disc 6, the user 7 simply needs to slightly pull open the disc 6 upward from the socket 12, the elasticity of the elastic piece 21 would make the disc 6 come off easily from being stuck by the protruding lump 23 of the elastic piece 21.

Figure 5:
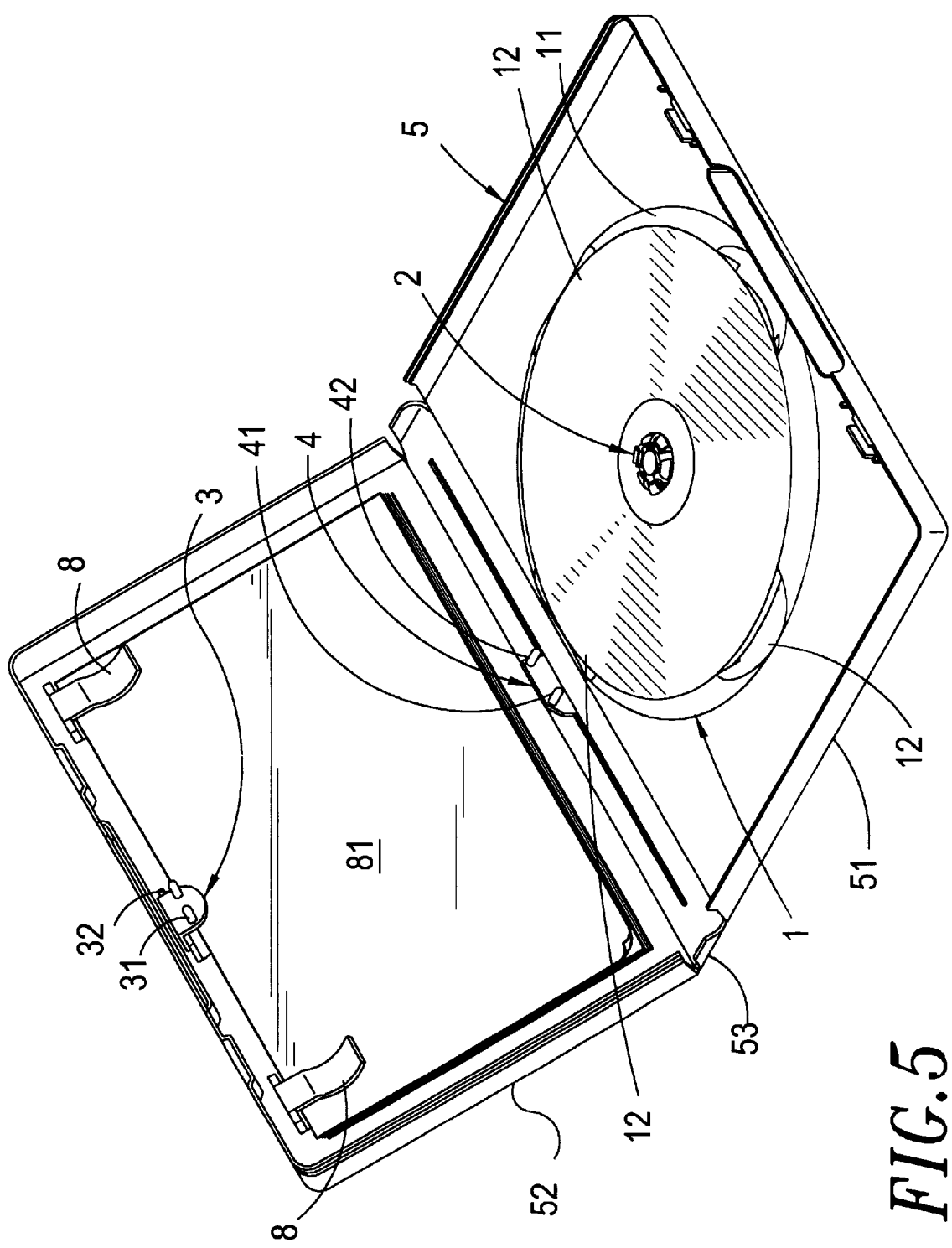
FIG. 5 is the third three-dimensional illustration for the disc location mechanism of the CD box.

FIG. 5 is the third three-dimensional illustration for the disc location mechanism of the CD box. From this figure, the present invention can be equipped with clips 8 on adequate locations of the box lid 52 in order to clip assistant tools 81, such as manuals or notepaper, which increase the added value and the practicability of the present invention.

In comparison with the traditional technology mentioned earlier, the disc location mechanism of the CD box provided by this present invention possesses the following advantages:

(1) The holding props that shore up the disc placed inside the CD box protects the surface of the disc from being scratched resulted from revolving or sliding.

(2) When the user opens up the CD box and tries to take off the disc, the take-and-put holding mechanism makes it easy to take off the disc through the elasticity of the elastic piece, which reduces the influence of being restricted by the direction of the force.

(3) More than one sockets provided on the bottom edge of the disc compartment of the present invention make it convenient for the user to take off the disc from every direction.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A disc location mechanism of a CD box, mainly lying inside said CD box, comprising:

a disc compartment equipped with more than one sockets adequately on a bottom edge of said disc compartment;

more than one pairs of take-and-put holding mechanism consisting of an elastic piece and a fixture piece, said elastic piece furnished with a hole at a bottom, with a protruding lump on a top edge, while said fixture pieces of each pair connecting one another;

a first holding piece with at least one or more holding props;

a second holding piece with at least one or more holding props;

said mechanism lying in said CD box formed by a box body and a box lid connecting together, said disc compartment settling adequately said box body with more than one pairs of take-and-put holding mechanism on a center of said disc compartment, on an edge of said box body sitting said first holding piece while said second holding piece resting on an edge of a joint connecting said box body and said box, when the user places a CD on said disc compartment, covering up said box lid, said holding props of said first holding piece and said second holding piece shoring up to said disc and said protruding lump of said elastic piece securing said disc right on said disc compartment, when the user opens up said CD box and attempts to take off a disc, elasticity of said elastic piece makes a disc easily come off from said protruding lump of said elastic piece designed for securing discs.

2. The disc location mechanism of a CD box of claim 1, said mechanism and said CD box make a whole piece.

3. The disc location mechanism of a CD box of claim 1, there are four sockets in total on an edge of said disc compartment.

4. The disc location mechanism of a CD box of claim 1, there are three pairs of take-and-put holding mechanism.

* * * * *